May 18, 1965

J. B. PERDUE ETAL 3,184,081

SILAGE DISTRIBUTOR

Filed Aug. 15, 1963

INVENTORS
James B. Perdue &
BY Lawrence E. Tate

Jennings, Carter & Thompson

Attorneys

# United States Patent Office 3,184,081
Patented May 18, 1965

3,184,081
SILAGE DISTRIBUTOR
James B. Perdue and Lawrence E. Tate,
P.O. Box 38, Browns, Ala.
Filed Aug. 15, 1963, Ser. No. 302,289
4 Claims. (Cl. 214—17)

This invention relates to a silage distributor and has for an object the provision of means for scattering the silage as it is introduced into a silo whereby it is distributed evenly to prevent hard and soft spots therein.

Another object of our invention is to provide a silage distributor in which the silage is delivered in the silo in such a manner that the outer edges of the mass of silage in the silo is at an elevated position relative to the center of the silo, thus assuring that an air-tight seal is provided adjacent the inner surface of the silo to prevent spoilage of the silage.

Another object of our invention is to provide a silage distributor of the character designated in which the full capacity of the silo is utilized due to the even distribution of the silage therein.

Another object of our invention is to provide a silage distributor of the character designated which deposits the silage in the silo in such a manner that the silage may be removed therefrom by an automatic unloader in a uniform manner and without malfunctioning of the automatic unloader due to the fact that there are no packed and soft spots in the mass of silage.

A further object of our invention is to provide apparatus for distributing silage in a silo of the character designated which requires a minimum of labor to operate the same and completely eliminates the necessity of placing men within the silo for distributing the silage.

A still further object of our invention is to provide a silage distributor of the character designated which shall be extremely simple of construction and manufacture and one which may be mounted in conventional silos with a minimum of effort.

Heretofore in the art to which my invention relates, silos have been filled by blowing the silage into the top of the silo adjacent the center thereof. The silage thus pyramids and forms packed and soft spots. Oftentimes, several men are placed inside the silo in an attempt to distribute the silage evenly. This has been unsatisfactory due to the fact that it is not possible for manual labor to attain an even distribution of the incoming silage and at the same time the overall cost of filling the silo is greatly increased. Accordingly, the end result is that the silage is tightly packed in some places and loosely distributed in others. Not only does this prevent utilization of the full capacity of the silo, but brings about spoilage of the silage. Furthermore, the occurrence of packed and loose spots in the silage prevents satisfactory operation of automatic unloading apparatus.

In accordance with our present invention, we mount a rotary impeller within the silo subjacent the point of introduction of the silage. A horizontal distributor plate is mounted for free rotation subjacent the impeller whereby the silage falling onto the distributor plate engages the blades of the impeller to thus impart rotation to the distributor plate which is in direct proportion to the volume of silage being introduced.

Apparatus embodying features of our invention is illustrated in the accompanying drawing, forming a part of this application, in which.

Figure 1:
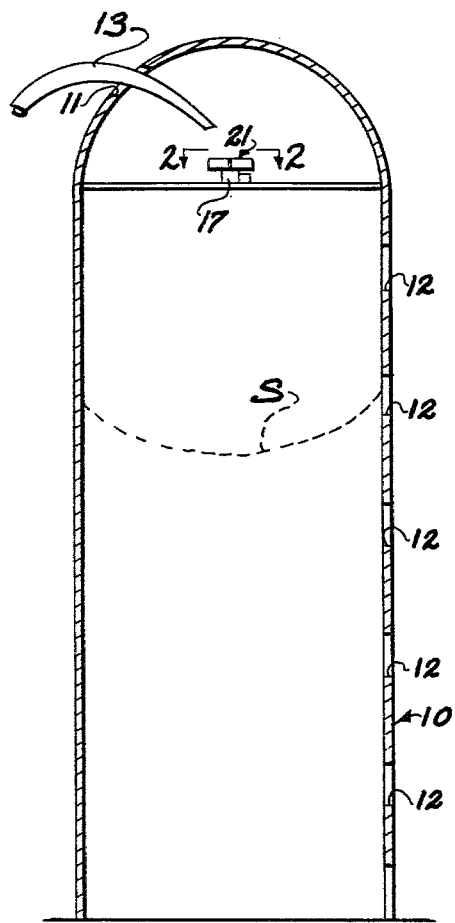
FIG. 1 is a vertical sectional view through a silo showing our improved silage distributor mounted therein.

Referring now to the drawing for a better understanding of our invention, we show a silo 10 having the usual filling opening 11 and openings 12 for removing the silage therefrom. Silage is introduced into the top of the silo by a supply conduit 13.

Extending transversely of the upper portion of the silo 10 and secured thereto by suitable means are elongated support members 14 for supporting a motor 16 and a transmission housing 17. Projecting outwardly of the transmission housing 17 and operatively connected to the motor 16 by suitable means, such as a drive chain 18, is a vertical drive shaft 19.

Figure 2:
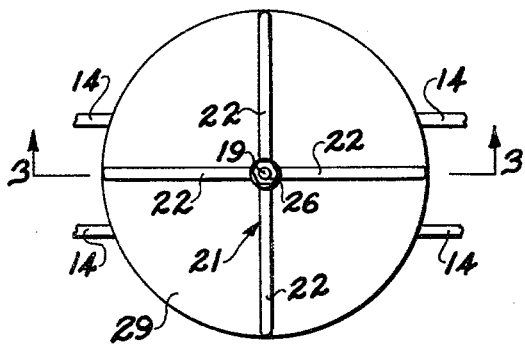
FIG. 2 is an enlarged, fragmental view taken generally along the line 2—2 of FIG. 1.

Mounted nonrotatably on the drive shaft 19 is an impeller 21 having a plurality of angularly spaced blades 22 which extend in vertical planes, as shown in FIG. 2. The impeller is secured to the shaft 19 between a collar 23 and a washer 24 by a suitable lock nut 26.

Figure 3:
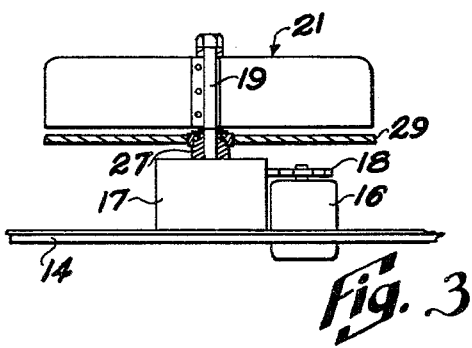
FIG. 3 is a vertical sectional view taken generally along the line 3—3 of FIG. 2; and, FIG. 4 is an enlarged fragmental view showing the supporting means for the impeller and the distributor plate.
Figure 4:
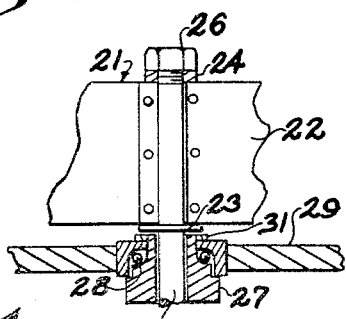

Surrounding the shaft 19 is a bearing sleeve member 27 which is carried by the housing 17. As shown in FIG. 4, the shaft 19 is adapted for free rotation relative to the bearing sleeve member 27. Mounted for free rotation on the bearing sleeve member 27 by suitable bearings 28 is a disc-like distributor plate 29. As shown in FIGS. 2 and 3, the diameter of the distributor plate 29 is substantially equal the diameter of the impeller 21. The distributor plate 29 is held against axial movement of the bearing sleeve member 27 by a lock nut 31, as shown in FIG. 4.

From the foregoing description, the operation of our improved silage distributor will be readily understood. Upon energizing the motor 16, the impeller 21 is driven by the shaft 19. While the shaft 19 may be rotated at various speeds, depending upon the diameter of the silo, in actual practice we have found that speeds ranging from approximately 175 to 215 revolutions per minute are satisfactory in every respect. In view of the fact that the distributor plate 29 is supported freely and does not rotate with the shaft 19, the distributor plate remains stationary until silage is introduced thereon. Upon introducing the silage through the conduit 13, it falls onto the impeller 21 and the distributor plate 29 whereby the distributor plate 29 prevents the silage from falling directly through the impeller. When a small amount of silage is delivered onto the distributor plate 29, the plate rotates slowly. However, as the rate of introduction of the silage is increased, the distributor plate 29 revolves faster to maintain equal distribution of the silage regardless of the rate of introduction thereof.

As the silage falling onto the distributor plate 29 engages the blades 22 of the rotating impeller 21, rotation is imparted to the distributor plate 29 which is in direct proportion to the volume of silage being introduced into the silo. That is to say, as the rate of introduction of the silage into the silo increases, the rate of rotation of the distributor plate 29 is increased to thereby scatter the silage uniformly in the silo. Accordingly, the silage is thrown outwardly and downwardly around the silage distributor to provide a saucer-like upper surface indicated at S. The silage is thus uniformly packed around and adjacent the inner surface of the silo to provide an air-tight seal which prevents spoilage of the silage.

From the foregoing, it will be seen that we have devised an improved apparatus for distributing silage in a silo. By providing a distributor plate subjacent the impeller which always rotates at a speed which is in direct proportion to the volume of silage being introduced, we not only obtain even distribution of the silage in the silo but provide apparatus in which the rate of introduction of the silage may be greatly increased. Also, by providing a silage distributor which avoids soft and packed spots in the silage, the silage may be removed from the silo by automatic unloading apparatus without difficulty. Furthermore, our improved silage distributor eliminates the necessity of placing men within the silo for distributing the silage and at the same time permits utilization of the full capacity of the silo.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. Apparatus for distributing silage as it is introduced into a silo comprising:
    (a) a rotary impeller mounted within the silo subjacent the point of introduction of silage for rotation about a generally vertical axis and having radially extending blades,
    (b) a generally horizontal distributor plate mounted subjacent said impeller for free rotation relative to said impeller about a vertical axis concentric with the axis of rotation of said impeller and in position to support the silage at an elevation to be engaged by said impeller, and
    (c) means to rotate said impeller as silage is introduced whereby silage falling onto said distributor plate imparts rotation to said distributor plate by engagement of the impeller with the silage, said rotation of the distributor plate being in direct proportion to the volume of silage being introduced.

2. Apparatus for distributing silage as defined in claim 1 in which said blades extend in generally vertical planes.

3. Apparatus for scattering silage as defined in claim 1 in which the distributor plate is disc-shaped and the diameter thereof is substantially equal the diameter of the impeller.

4. Apparatus for distributing silage as it is introduced into a silo comprising:
    (a) a vertical shaft mounted for rotation within said silo adjacent the longitudinal center thereof,
    (b) a rotary impeller mounted on said shaft subjacent the point of introduction of silage and having generally vertical, radially extending blades,
    (c) a generally horizontal distributor plate mounted subjacent said impeller for free rotation relative to said impeller about a vertical axis concentric with said shaft and in position to support the silage at an elevation to be engaged by said impeller, and
    (d) means to rotate said impeller as silage is introduced onto said distributor plate to impart rotation to said distributor plate by engagement of the impeller with the silage, said rotation of the distributor plate being in direct proportion to the volume of silage being introduced.

References Cited by the Examiner

UNITED STATES PATENTS

| 2,860,790 | 11/58 | Erickson et al. | 214—17 |
| 3,001,465 | 9/61 | Donelson | 198—128 X |

FOREIGN PATENTS

| 591,069 | 4/25 | France. | |

HUGO O. SCHULZ, *Primary Examiner.*